(12) United States Patent
Okumura et al.

(10) Patent No.: US 7,481,703 B2
(45) Date of Patent: Jan. 27, 2009

(54) AIR CONDITIONER FOR VEHICLE

(75) Inventors: Yoshihiko Okumura, Kariya (JP);
Shigeyoshi Nagaya, Handa (JP);
Toshihiko Muraki, Kariya (JP)

(73) Assignee: Denso Corporation, Kariya (JP)

( * ) Notice: Subject to any disclaimer, the term of this patent is extended or adjusted under 35 U.S.C. 154(b) by 272 days.

(21) Appl. No.: 11/474,797

(22) Filed: Jun. 26, 2006

(65) Prior Publication Data

US 2006/0288722 A1 Dec. 28, 2006

(30) Foreign Application Priority Data

Jun. 27, 2005 (JP) ............................. 2005-187014

(51) Int. Cl.
*B60H 1/02* (2006.01)
(52) U.S. Cl. .................. 454/126; 454/121; 454/143
(58) Field of Classification Search ................. 454/121, 454/126, 143, 906
See application file for complete search history.

(56) References Cited

U.S. PATENT DOCUMENTS

| | | | |
|---|---|---|---|
| 4,531,671 A * | 7/1985 | Schwenk | 237/12.3 B |
| 5,399,120 A * | 3/1995 | Burns et al. | 454/126 |
| 6,386,966 B1 * | 5/2002 | Kuwayama et al. | 454/139 |
| 6,499,508 B2 * | 12/2002 | Sato et al. | 137/625.45 |
| 6,669,548 B2 * | 12/2003 | Fujiwara | 454/143 |
| 6,688,964 B2 * | 2/2004 | Uemura et al. | 454/121 |
| 6,808,045 B2 * | 10/2004 | Campbell | 181/205 |
| 6,913,529 B2 * | 7/2005 | Seki | 454/121 |
| 7,059,146 B2 | 6/2006 | Nakajima | |
| 2004/0129010 A1 | 7/2004 | Nakajima | |

FOREIGN PATENT DOCUMENTS

| | | |
|---|---|---|
| JP | 62-043807 | 3/1987 |
| JP | 2001-121944 | 5/2001 |

\* cited by examiner

*Primary Examiner*—Derek S. Boles
(74) *Attorney, Agent, or Firm*—Harness, Dickey & Pierce, PLC (57) ABSTRACT

An air conditioner includes an air conditioning case for defining an air passage through which air flows into a vehicle compartment, a functional member located in the air conditioning case for performing air conditioning of the vehicle compartment, an outside wall member arranged outside a side wall of the air conditioning case to form a clearance with the side wall, and a coupling part through which the outside wall member is integrated with the side wall. In this air conditioner, the outside wall member is located across approximately a projected line of a central line of the functional member extending in a longitudinal direction of the functional member, projected onto the side wall. Therefore, a vibration of the air conditioning case can be reduced, and a noise generation can be effectively restricted.

11 Claims, 8 Drawing Sheets

AIR CONDITIONER FOR VEHICLE

CROSS REFERENCE TO RELATED APPLICATION

This application is based on Japanese Patent Application No. 2005-187014 filed on Jun. 27, 2005, the contents of which are incorporated herein by reference in its entirety.

FIELD OF THE INVENTION

The present invention relates to an air conditioner for a vehicle that blows conditioned air into a vehicle compartment of an automobile or the like.

BACKGROUND OF THE INVENTION

In a conventional air conditioner for a vehicle, generally, an air conditioning unit for adjusting air to be blown off into a vehicle compartment is surrounded by an air conditioning case and is mounted to a dash panel for separating the vehicle compartment from the engine room of the vehicle. Hence, there are cases where vibrations caused by the engine and a functional member for air conditioning such as an evaporator are transmitted to the air conditioning case via the dash panel to vibrate the side walls of the air conditioning case to thereby make noises.

JP patent No. 2004-196125A (corresponding to US 2004/0129010A) is known as a document to disclose the technology of reducing noises due to the vibrations of the air conditioning case. JP patent No. 2004-196125A discloses that the rigidity of the air conditioning case itself is increased to reduce the vibration of the air conditioning case by the use of the technology of integrally forming reinforcing ribs in the shape of a ladder or a lattice on the whole side wall of the air conditioning case, the technology of putting a weight formed separately on the air conditioning case, and the technology of changing the thickness of the air conditioning case for the respective portions of the case.

However, the above-mentioned conventional air conditioner for a vehicle can produce a measure of effect in inhibiting the occurrence of noises by reducing the vibration of surface of the air conditioning case but cannot produce a sufficient effect.

Figure 9:
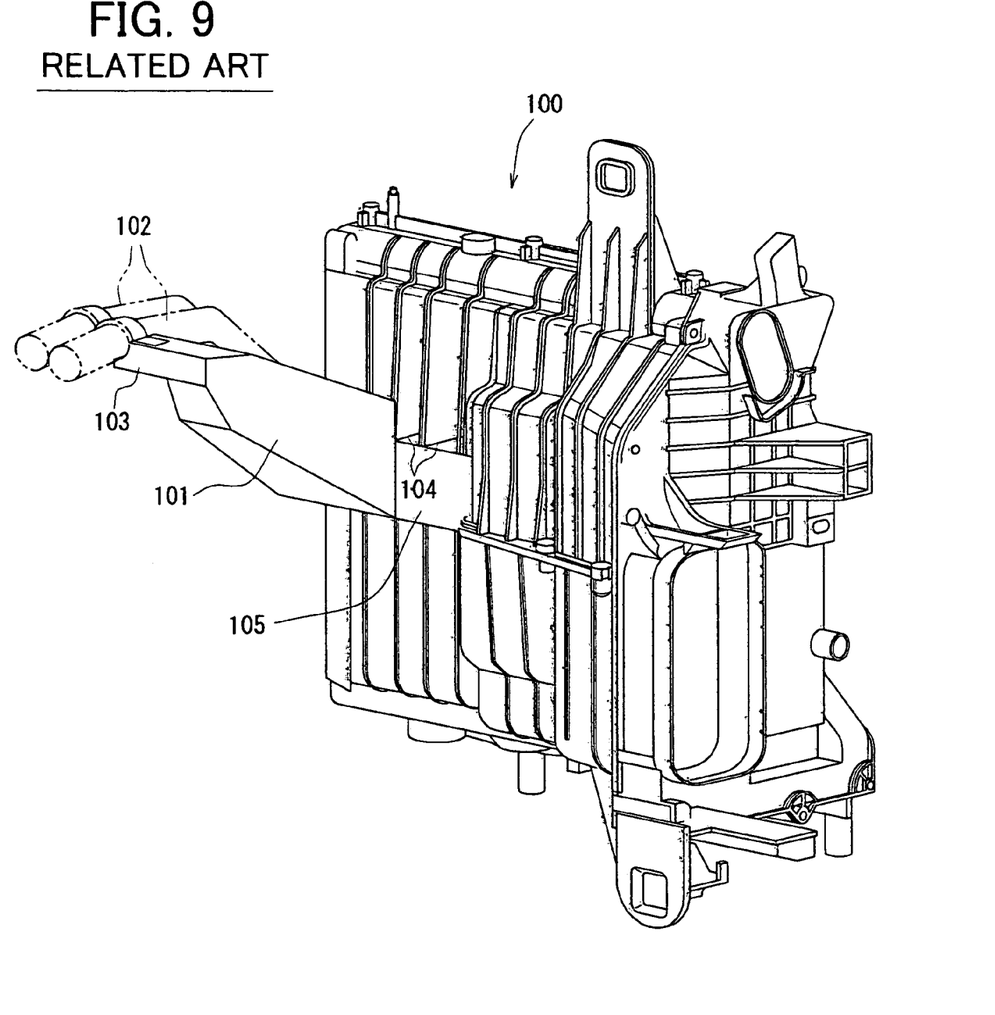
FIG. 9 is a schematic perspective view showing an air conditioning case and an arm portion integrated with the air conditioning case in a related art.

In an air conditioning unit shown in FIG. 9, an air conditioning case 100 is provided to accommodate an evaporator and a heater core, and an arm portion 101 is formed integrally with an outer wall of the air conditioning case 100 on the side of the engine room of the vehicle. A heater pipe base 103 for mounting a heater pipe 102 extending from the heater core is provided at a tip end portion of the arm portion 101 to be separate from the air conditioning case 100. Furthermore, a reinforcement rib 104 and a reinforcement plate 105 are provided at a base end side of the arm portion 101 so as to reinforce the part between the outer wall of the air conditioning case 100 and the arm portion 101. When the load is applied to the heater pipe 102, the load is transmitted to the air conditioning case 100 through the arm portion 101. In this case, the reinforcement rib 104 and the reinforcement plate 105 are used only for reinforcing the arm portion 101, but are not for reducing the noise due to vibration of the air conditioning case 100. Therefore, the reinforcement plate 105 is provided in a small range capable of reinforcing the arm portion 101, but is not extended to a large range.

SUMMARY OF THE INVENTION

The present invention has been made in view of the above-mentioned problem. The object of the present invention is to provide an air conditioner for a vehicle that can effectively reduce an occurrence of noises by reducing the vibration of an air conditioning case.

According to an aspect of the present invention, an air conditioner for a vehicle includes an air conditioning case for defining an air passage through which air flows into a vehicle compartment, a functional member located in the air conditioning case for performing air conditioning of the vehicle compartment, an outside wall member arranged outside of a side wall of the air conditioning case to form a clearance with the side wall, and a coupling part through which the outside wall member is integrated with the side wall. In the air conditioner, the outside wall member is located across approximately a projected line of a central line of the functional member extending in a longitudinal direction of the functional member, projected onto the side wall. Accordingly, the outside wall member is formed in a shape extending to both sides of the central line of the functional member, and is integrated with the side wall via the coupling part. Hence, it is possible to reduce the surface vibration of the air conditioning case, relative to vibration from the functional member and the vibration from an engine room, so as to effectively reduce the occurrence of noises.

For example, the outside wall member can be provided with a stepped part or a curved part to have a variation in the clearance in an air flow direction. Furthermore, the clearance can be provided approximately along the central line of the functional member, and can be difference in size between the outside wall member and the side wall. In addition, the coupling part can be constructed of a plurality of ribs, or the coupling part constructed of at least one rib can be made longer than a width of the outside wall member in an extending direction of the rib. Alternatively, the coupling part can be arranged adjacent to a stepped portion or a curved portion provided on the side wall, or a stepped portion or a curved portion provided on the outside wall member. Alternatively, the coupling part may be constructed of a lattice-shaped rib.

The air conditioning case can be constructed of a plurality of case parts to be dividable. In this case, a combining part for combining the plurality of case parts can be provided, and the combining part can extend along approximately the central line of the functional member. Furthermore, a plurality of join portions can be provided in the combining part, through which the plurality of case parts are joined with each other by using a joint member. In addition, the joint member can be constructed of a fastening screw, and can be provided with a check opening for checking a state of the fastening screw.

According to another aspect of the present invention, an air conditioner for a vehicle includes: an air conditioning case that defines an air passage through which air flows into the vehicle compartment, and is constructed of a plurality of case parts to form an outer frame of an air conditioning unit; a plurality of outside wall members arranged outside of a side wall of the air conditioning case to form a clearance with the side wall; and a coupling part through which the plurality of outside wall members are integrated with the side wall. In the air conditioner, the plurality of outside wall members are arranged on two sides sandwiching a joining part of the case parts. Accordingly, it is possible to reduce the surface vibration of the air conditioning case, relative to the vibration from the functional member and the vibration from an engine room, so as to effectively reduce the occurrence of noises.

For example, the outside wall members can be provided with at least one or more opening for cooling a mold, and the outside wall members may be joined to each other at an outer side of the side wall. Furthermore, the coupling part can be constructed with a plurality of plate ribs protruding from a wall surface of the side wall and extending along the wall surface of the side wall. In this case, the outside wall members may be provided in a range smaller than the wall surface of the side wall, and the plate ribs may extend outward from an end portion of the outside wall members. For example, the functional member is an evaporator for cooling air passing therethrough.

BRIEF DESCRIPTION OF THE DRAWINGS

Additional objects and advantages of the present invention will be more readily apparent from the following detailed description of preferred embodiments when taken together with the accompanying drawings.

DETAILED DESCRIPTION OF THE PREFERRED EMBODIMENTS

First Embodiment

Figure 1:
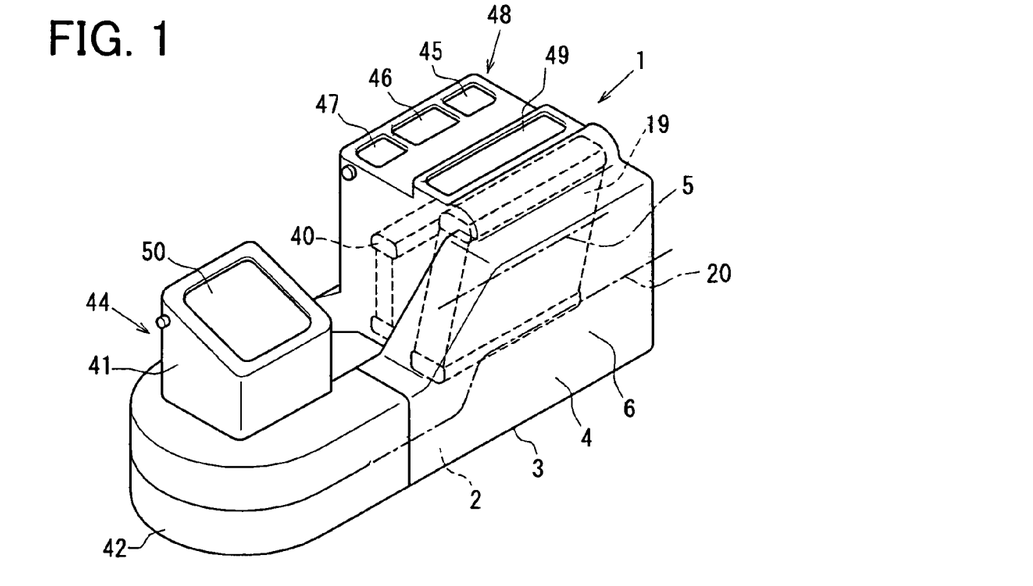
FIG. 1 is a schematic diagram showing the general construction of an air conditioning unit of an air conditioner for a vehicle in a first embodiment.

Hereinafter, the first embodiment will be described by the use of FIG. 1 to FIG. 5 and FIG. 8. FIG. 1 is a schematic diagram showing the general construction of an air conditioning unit of an air conditioner for a vehicle in this embodiment.

An air conditioner of this embodiment is used for a vehicle for private use or for commercial use and is constructed in such a way that air conditioning in a vehicle compartment can be controlled automatically by a control device or manually. This air conditioning device 1 of an air conditioner for a vehicle is fixed to the side wall surface of a dash panel for separating the engine room on the front side of the vehicle from the vehicle compartment. Moreover, it is also recommendable to employ construction in which the air conditioning device 1 is arranged in a rear trunk room.

As shown in FIG. 1, the air conditioning device 1 is provided with an intake unit 44, an air conditioning unit 48, and a duct (corresponding to a part of an air conditioning case 3) for connecting the intake unit 44 to the air conditioning unit 48. The intake unit 44 has a blower (not shown) and an air inlet mode selecting means and these are arranged in a box so as to communicate with each other. The blower is constructed of a motor, a centrifugal fan, and a casing 42. An inside/outside air switching box 41 constructing the air inlet mode selector means is arranged on an upstream side of the casing 42. An inside air inlet (not shown) for taking in air (i.e., inside air) inside the vehicle compartment and an outside air inlet 50 for taking in air (i.e., outside air) outside the vehicle compartment are formed in this inside/outside air switching box 41. An air inlet mode selector door (not shown) capable of selectively opening and closing the inside air inlet and the outside air inlet 50 are arranged in the inside/outside air switching box 41.

The air conditioning unit 48 includes a cooler unit, and a heater unit, and is formed into a box integrally formed of resin. The mode selector means includes the above-mentioned box having face openings 45, 46, 47, a foot opening (not shown), and a defroster opening 49 formed therein, and this box is provided with a mode selector door (not shown) capable of selectively opening and closing the plurality of openings described above.

Here, in a face mode, the face openings 45, 46, 47 are opened, and conditioned air from the face openings 45, 46, 47 is blown off to the upper half body of an occupant via a face duct (not shown). In a foot mode, the foot opening is opened, and conditioned air from the foot opening is blown off to the foot area of the occupant via a foot duct (not shown). In a defroster mode, the defroster opening 49 is opened and conditioned warm air is blown off to window glass and the like via a defroster duct (not shown). In a bi-level mode, conditioned cool air and conditioned warm air are blown off at the same time from the face openings 45, 46, 47 and from the foot opening.

The cooler unit is constructed of an evaporator 19, which receives air blown off from a blower and evaporates low-temperature and low-pressure refrigerant having pressure reduced by an expansion valve in a refrigeration cycle. The evaporator 19 is arranged so as to cross an air passage on the upstream side in the flow direction of air in the air conditioning case 3, and is held also by the air conditioning case 3. The heater unit is constructed of a heater core 40 for heating air to be blown by using the cooling water (hot water) of the engine for vehicle running as a heat source, and the heater core 40 is arranged so as to partly cross the air passage on the downstream side in the flow direction of air of the evaporator 19. Moreover, an air mixing door (not shown) for adjusting the ratio between the amount of air passing through the heater core 40 and the amount of air bypassing the heater core 40 is arranged in the air passage on the upstream side of the heater core 40 and on the downstream side of the evaporator 19.

A duct integrally connects the intake unit 44 to the air conditioning unit 48, and is constructed of a part of an air conditioning case 3 nearly shaped like a cylinder and has an air passage 2 formed therein. The duct has an air suction port 32, which communicates with the discharge port of the blower, formed on one side and has an air discharge port 33, which communicates with an air suction part of the evaporator 19 via the air passage, formed on the other side communicating with the air suction part of the evaporator 19.

Figure 2:
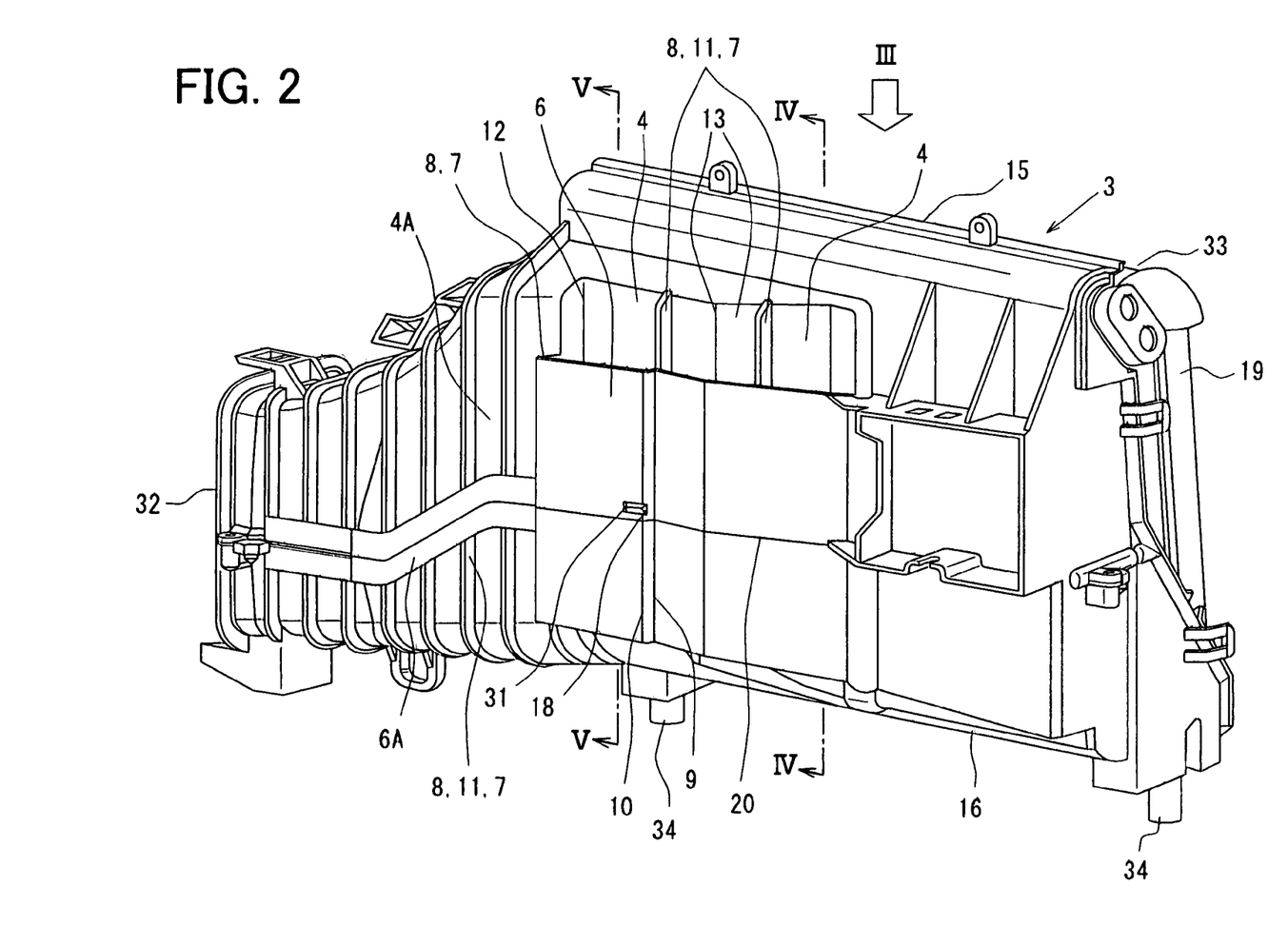
FIG. 2 is a perspective view showing the relationship between the air conditioning case and an evaporator as a functional member for air conditioning in the first embodiment.
Figure 3:
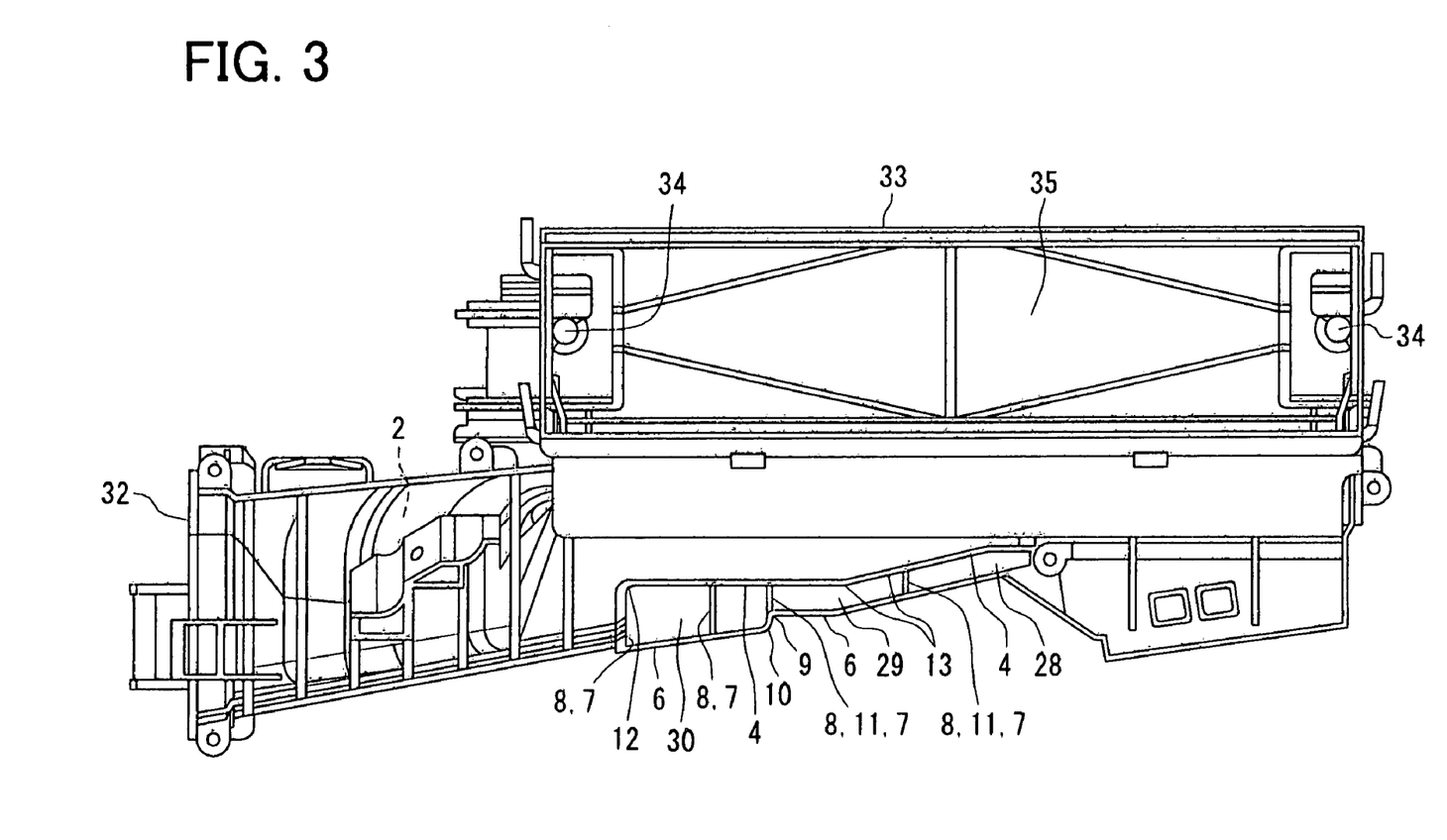
FIG. 3 is a plan view of the air conditioning case without having therein an evaporator, when viewed from the direction III in FIG. 2.

FIG. 2 is a perspective view showing the relationship between the air conditioning case and the evaporator, which is one example of a functional member for air conditioning in this embodiment. FIG. 3 is a plan view of the air conditioning case when viewed in the direction of III in FIG. 2 (however, the evaporator is eliminated).

The air conditioning device 1 is constructed as shown in FIG. 2 and FIG. 3. That is, the air conditioning case 3 is arranged so as to form the air passage 2 communicating with the inside of the intake unit 44. Furthermore, this air conditioning case 3 is provided with an outer wall part 6 that holds the evaporator 19 arranged so as to communicate with the air passage 2, and is arranged outside the side wall 4 of the air conditioning case 3 with a clearance between itself and the side wall 4. In addition, the air conditioning case 3 is formed in a shape straddling a nearly central line 5 extending in the direction of length of the evaporator 19 or is formed across a projected line of the nearly central line of the evaporator 19, projected on the side wall 4, and the outer wall part 6 is formed integrally with the side wall 4 with a specified clearance created between itself and the side wall 4 via ribs 8, 11 as coupling parts 7. Two drain ports 34 are formed in the lower portion of the air conditioning case 3 with a specified clearance between them in the left and right direction or in the direction of length, and water produced in the air conditioning case 3 by condensation or water adhering to the evaporator 19 and flowing down is discharged outside from the drain ports 34.

The air passage 2 extending from the air suction port 32 to the downstream side is a nearly cylindrical passage of rectangular cross section and constructs a passage extending from the air suction port 32 to the air suction portion of the evaporator 19 held by the air conditioning case 3. The air passage 2 is surrounded by a side wall part 4A so as to gradually increase its cross-sectional area from the air suction port 32 to the downstream side. The air passage 2 closer to the downstream side than the air passage surrounded by the side wall part 4A is surrounded by the side wall 4 without changing its cross-sectional area to a large extent.

The air discharge port 33 communicates with the air passage 2 and is formed in a shape nearly equal to the air blowoff port of the evaporator 19. Furthermore, the air discharge port 33 is formed in a shape extending nearly in parallel to the side wall 4 of the air conditioning case 3 and extending in the up and down direction and in the left and right direction of the air conditioning case 3. Further, the air discharge port 33 is arranged in such a way that air flowing in from the air suction port 32 by a discharge flow produced by the blower flows through the air passage 2 and is then bent nearly in a direction perpendicular to the air passage 2 extending in the left and right direction or in the direction of length, thereby being made to flow to the air suction portion of the evaporator 19.

The side wall 4 constructs the side shape of the air conditioning case 3 elongated in a lateral direction and is formed so as to be parallel to the air passage 2 extending in the left and right direction or in the direction of length and is formed so as to be nearly parallel to the air suction portion of the evaporator 19 arranged on and held by an evaporator holding bottom 35 of the air conditioning case 3. The ribs 8, 11 constructing the coupling part 7 are formed on the surfaces of the side wall 4 and the side wall 4A. The ribs 8, 11 are arranged at specified intervals nearly in parallel to the up and down direction or the direction of shortness of the air conditioning device 1, and couples the side wall 4 and the outside wall member 6 and the side wall 4A to an outside wall member 6A, respectively. Moreover, the ribs 8, 11 are formed to be longer than the widths of the outside wall members 6 and 6A and are arranged so as to protrude in the up and down direction and in the direction of shortness from the widths of the outside wall members 6 and 6A. Furthermore, the ribs constructing the coupling part 7 may be constructed of a lattice-shaped rib or the other shape.

The side wall 4 is formed so as to have a stepped portion 12, a curved portion 13, or a slanted portion in the process of extending in the left and right direction or in the direction of length. The ribs 8, 11 of the coupling part 7 are arranged at positions adjacent to the stepped portion 12 or the curved portion 13.

The outside wall members 6 or 6A can be arranged outside the side wall 4 so as to straddle the nearly central line 5 extending in the direction of length of the evaporator 19 that one example of a functional member for air conditioning mounted in the air conditioning case 3, in the up and down direction or in the direction of shortness. Alternatively, the outside wall members 6 or 6A can be formed across the projected line of the nearly central line 5 of the evaporator 19, projected on the side wall 4, and are arranged outside the side wall 4. The outside wall members 6 or 6A are formed in a shaped and a size sufficiently large enough to straddle the nearly central line 5 or to cross the projected line of the nearly central line 5. This nearly central line 5 is positioned so as to nearly coincide with the nearly central line 20 in the direction of length of the outside wall member 6 or the air conditioning case 3. The width in the up and down direction or in the direction of shortness of the outside wall member 6 is wider than that of the outside wall member 6A. Because the outside wall member 6A is closer to the functional member for air conditioning, which is one of sources of causing vibration, when the outside wall member 6A is formed in a wide shape, the outside wall member 6A can more improve the function of inhibiting the vibration of plane of the air conditioning case 3.

In this regard, the outside wall members 6, 6A are plate-shaped parts and are as thick as the side wall 4. Moreover, the outside wall members 6, 6A are formed in such a way as to open an umbrella to the side walls 4, 4A, that is, in such a way as to straddle the nearly central line 5 and to cover the outer surface of the side wall 4. The vibrations of planes of the side walls 4, 4A are attenuated by this shape and size.

The outside wall member 6 is formed in a shape nearly parallel to the side wall 4 and is provided with a stepped portion 9, a curved portion 10, or a slanted portion in the middle portion extending in the left and right direction or the in the direction of length. The ribs 8, 11 as the coupling part 7 are arranged at positions adjacent to this stepped portion 9 or the curved portion 10.

As shown in FIG. 3, the clearance created between the outside wall member 6 and the side wall 4 which are formed in the direction along the nearly central line 5 of the functional member for air conditioning changes or is not uniform. For example, the clearance 30 created on the upstream side closer to the left of FIG. 3 in the left and right direction is larger than the clearances 29, 28 which are created on the downstream side closer to the right of FIG. 3 in the left and right direction than the clearance 30. The intervals between the clearances 28, 29, 30 are set, for example, at approximately 10 mm to 20 mm. Moreover, the intervals between the adjacent ribs 8, 11 constructing the coupling part 7 are set at approximately 50 mm. It could be recognized by experiment to be described later that even such comparatively wide intervals could produce an effect. When this interval is made smaller, the number of ribs is increased and hence the effect of reducing vibration is increased but the weight of the air conditioning case is increased, so that the dimensions of the respective parts in the air conditioning case 3 of this embodiment are employed in consideration of the balance between the effect and the weight.

Figure 4:
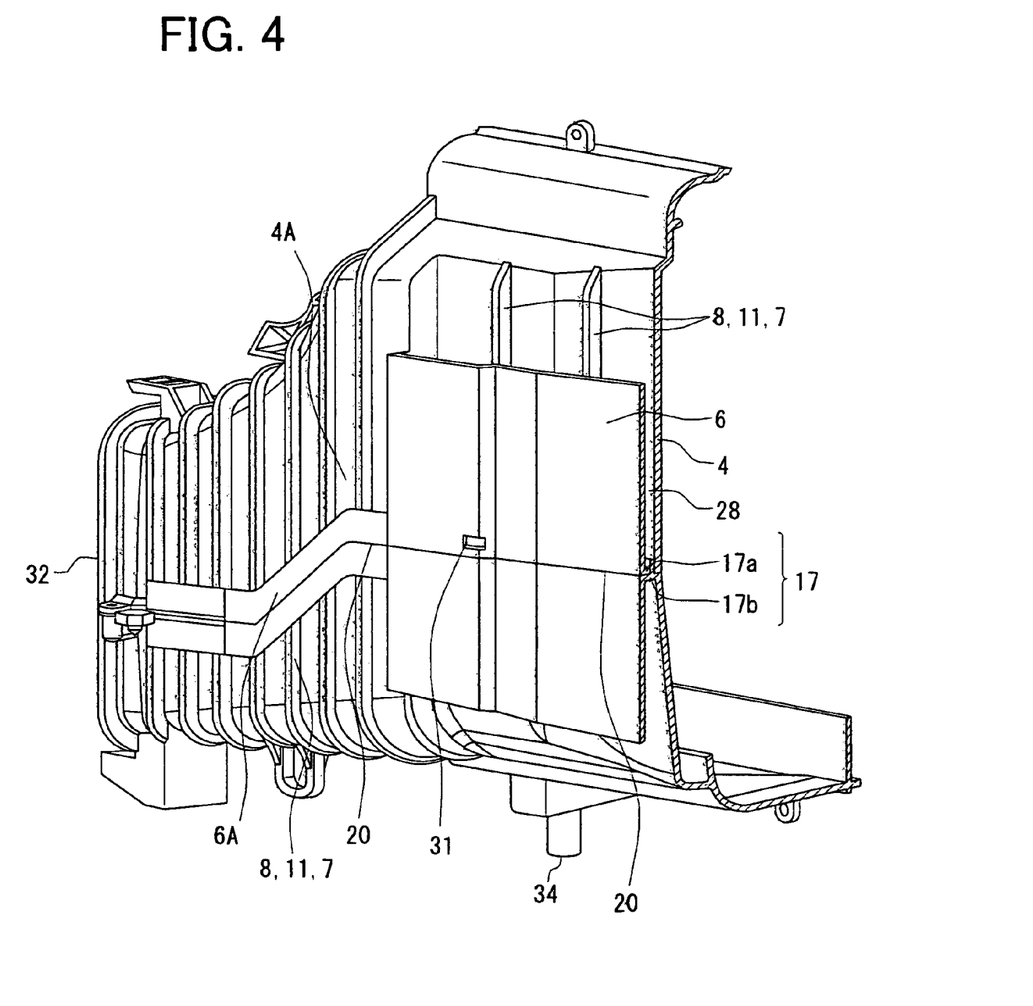
FIG. 4 is a perspective view showing a cut end of the air conditioning case when the air conditioning case is cut on the line IV-IV in FIG. 2.
Figure 5:
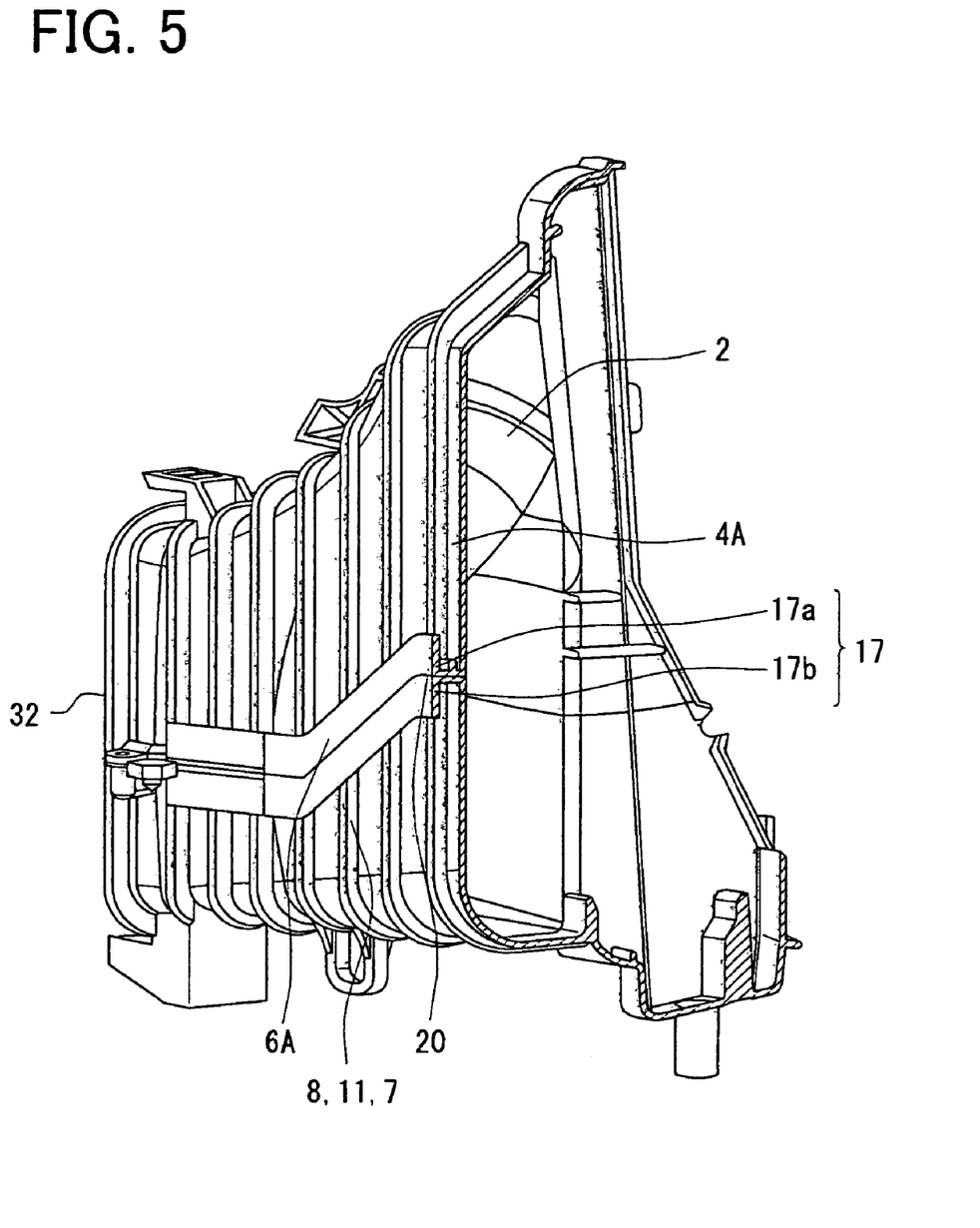
FIG. 5 is a perspective view showing a cut end of the air conditioning case without having therein the evaporator when the air conditioning case is cut on the line V-V in FIG. 2.

FIG. 4 is a perspective view showing the shape of a cut end when the air conditioning case is cut along the line IV-IV in FIG. 2. FIG. 5 is a perspective view showing the shape of a cut end when the air conditioning case is cut along the line V-V in FIG. 2. However, both of FIG. 4 and FIG. 5 show a state where the evaporator 19 is eliminated.

As shown in FIG. 2, FIG. 4 and FIG. 5, the air conditioning case 3 is constructed of two parts of an upper case 15 and a lower case 16 into which the air conditioning case 3 is divided. These upper case 15 and the lower case 16 are coupled to each other at the combining part 17 formed along the nearly central line 5 of the functional member for air conditioning, and combining portions 17a, 17b are formed in the combining part 17. As shown in FIG. 4, a cut end cut along the line IV-IV in FIG. 2 is formed in a shape in which three sides are surrounded by the upper case 15 and an evaporator holding bottom formed in the lower case 16 and in which only the air suction portion side of the evaporator 19 is open.

In FIG. 5, a cut end cut along the line V-V in FIG. 2 is formed in a shape to form a cylindrical air passage 2 completely surrounded by the upper case 15 and the lower case 16. Moreover, the clearance created between the outside wall member 6A and the outside wall 4A in FIG. 5 is, for example, approximately 4 mm to 5 mm and the width in the up and down direction of the outside wall member 6A is, for example, approximately 10 mm. The interval of adjacent ribs in the ribs 8, 11 constructing the coupling part 7 is set at approximately 20 mm which is smaller than the interval of the ribs of the outside wall member 6.

The upper case 15 and the lower case 16 are integrated with each other by joint member 18 (joint means) in the combining part 17. One example of this joint member 18 is constructed of the fastening screw, and a check opening 31 through which the degree of the fastening screw can be checked is made in the outside wall member 6. The joint member 18 employs construction in which: for example, the upper case 15 and the lower case 16 are opposed to each other at the combining part 17 and the combining portions 17a and 17b are put into contact with each other; the screw is screwed in a threaded hole made through the combining portions 17a and 17b in the up and down direction to fasten the upper and lower cases 15, 16. When the screw is screwed in, the screw is positioned with its head up and its threaded portion down and is screwed in from the upper side to the lower side by a screwdriver or the like. At this time, the manner in which the screw is screwed in the threaded hole can be checked through the check opening 31. The check opening 31 is made in a size through which the head of screw can be visually checked and at a position upper than the combining part 17a on the upper case 15 side.

Figure 8:
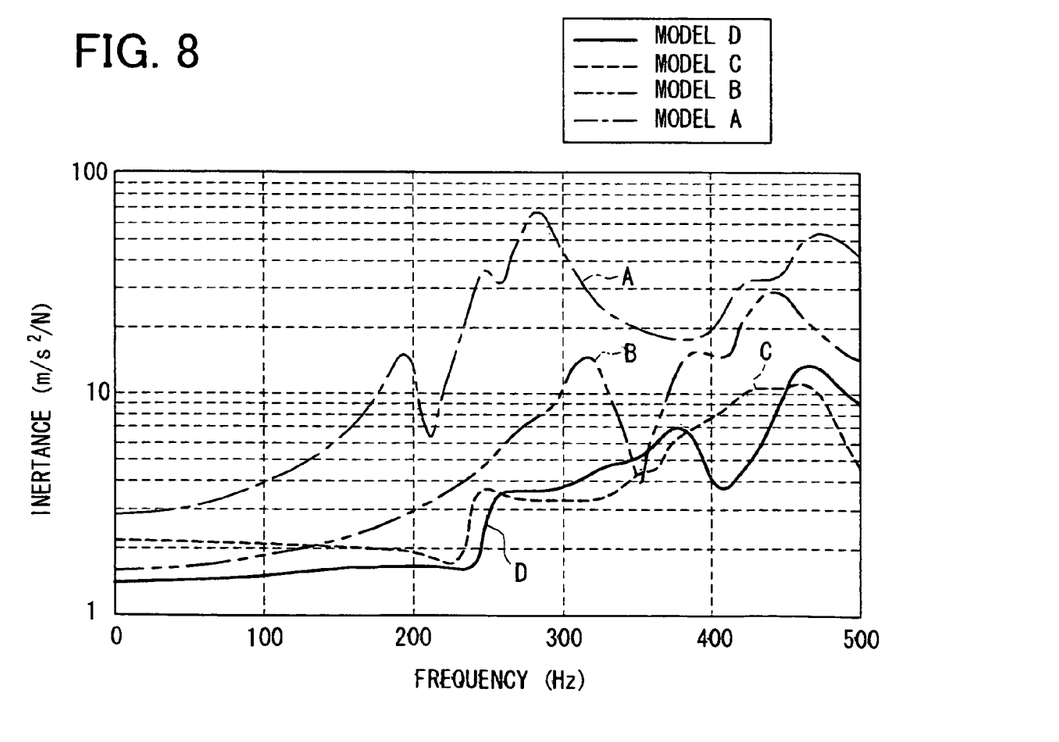
FIG. 8 is a graph showing the results of experiments to study the effect of reducing the vibration of an air conditioning case in accordance with the present invention.

Next, the results of experiments showing the effect of reducing the vibration of the air conditioning case 3 of this embodiment will be described. FIG. 8 shows the results of experiments to study a change in inertance (i.e., the ratio of acceleration to force) when vibration frequency is changed of four models (1)-(4) of: (1) an air conditioning case having no rib and no outside wall member (having a weight of 420 grams, hereinafter referred to as model A); (2) an air conditioning case having only ribs (having a weight of 540 grams, hereinafter referred to as model B); (3) an air conditioning case having only ribs (having a weight of 680 grams, hereinafter referred to as model C), and (4) an air conditioning case 3 in this embodiment having outside wall members (having a weight of 560 grams, hereinafter referred to as model D). The magnitude of this inertance can be thought to show the magnitude of vibration of plane in the air conditioning case.

In general, a frequency band that causes vibration noises and worsens noises in the vehicle compartment is a low frequency band (100 Hz to 500 Hz) of muffled sound or the like, and hence the effect of reducing vibrations in this frequency band is large. Therefore, also in the verification of the results of these experiments, the effect in this frequency band is determined with importance placed thereon.

As for the model A shown by a single dot and dash line, it is clear that although weight is small, a change in inertance is large in any frequency band described above. As for the model B shown by a double dot and dash line, although a change in inertance is substantially improved as compared with the model A, vibration is not within an allowable maximum. Noises in the low frequency band of muffled sound or the like are made at portions of the air conditioning case where a wide plane having little bumps and dips exists and where a wavelength is made long to increase the amplitude of the vibration of plane. The way to decrease the noises is to cause high-frequency vibration by making a wavelength short or to attenuate amplitude. Specifically, it is thought that many ribs are arranged to increase the strength of plane to thereby change the vibration of plane into high-frequency vibration of a short wavelength, but a considerable number of ribs are necessary. This is the construction of the air conditioning case corresponding to the model C.

Next, as for the models C and D, vibration in the above-mentioned frequency band is within the allowable maximum and the ribs and the outside wall members can produce the effect of the same level of inhibiting noises. However, as for the model C, the air conditioning case has a weight of 680 grams which is larger than the model D by approximately 21%. Hence, considering all the factors including reduction in weight and in material cost, the model D in this embodiment can be determined to be the best air conditioning case.

In this manner, as compared with the air conditioning case (model C) having only the ribs, the air conditioning case 3 of this embodiment employs construction having the above-mentioned outside wall members 6, 6A and inhibits vibration to within the allowable maximum although the air conditioning case 3 is substantially reduced in weight, thereby realizing an air conditioner for a vehicle having the large effect of inhibiting vibration. Here, in the air conditioning case (model B) having its weight set at the same weight as the air conditioning case 3 of this embodiment and having only ribs formed thereon, it is difficult to provide an air conditioner for a vehicle within the allowable maximum. Also from this point, the air conditioning case 3 of this embodiment is excellent in both aspects of a reduction in weight and the inhibition of vibration.

In this manner, the air conditioner for a vehicle of this embodiment employs the construction that has the air conditioning case 3 forming the air passage 2 in this air conditioning device 1, and the evaporator 19 as the functional member for air conditioning built in this air conditioning case 3, and has the outside wall member 6, which is arranged outside the side wall 4 of the air conditioning case 3 and has a shape straddling the nearly central line 5 of the evaporator 19 with a clearance created between itself and the side wall 4 or a shape crossing the nearly central line 5 of the evaporator 19 projected onto the side wall 4, integrally formed with the side wall 4 via the coupling part 7. Therefore, it is possible to reduce the plane vibration of the air conditioning case 3, relative to vibration from the evaporator or vibration transmitted from the engine room, and hence to effectively reduce the occurrence of noises.

Moreover, the outside wall member 6 is arranged in addition to the vibrated inner wall part 4, and is coupled to the inner wall part 4 by the coupling part 7 to provide the coupling part 7 with the forcible force in a lateral direction of preventing the coupling part 7 itself from waving. This can produce the effect of preventing the deformation of the coupling part 7.

Furthermore, in the case of employing construction in which the outside wall member 6 has the stepped part 9 or the curved part 10, the stepped part 9 or the curved part 10 increases the strength of the outside wall member 6 and hence can reduce the vibration of plane of the air conditioning case 3.

Still further, when the intervals between the clearances 28, 29, 30 created between the outside wall member 6 and the side wall 4 formed along the nearly central line 5 of the evaporator 19 are not equal to each other, the frequencies of vibrations of the outside wall member 6 and the side wall 4 are different from each other. This can prevent these parts from resonating with each other and hence can prevent the occurrence of noises.

Still further, when the construction is employed in which the side wall 4 and the outside wall member 6 are different from each other in the shape of outside plane, the vibration frequency characteristics of the inside wall and the outside wall of the air conditioning case 3 are changed from each other. However, coupling the inside wall to the outside wall by the ribs can produce the effect of reducing the resonance vibration of one plane by the other plane because the portions of different vibration frequency characteristics are coupled to each other.

Still further, when the coupling part 7 is constructed of a plurality of ribs 8, the strength of the coupling part 7 is increased. Hence, this can reduce the surface vibration of the air conditioning case 3.

Still further, when the coupling part 7 is constructed of a lattice-shaped rib, the strength of the coupling part 7 is further increased. Hence, this can reduce the propagation of vibration to the outside wall member 6 and hence can reduce the surface vibration of the air conditioning case 3.

Still further, when the rib 11 constructing the coupling part 7 is formed in a shape wider than the outside wall member 6, the strength of the coupling part 7 is further increased. Hence, this can reduce the propagation of vibration to the outside wall member 6 and hence can reduce the vibration of plane of the air conditioning case 3.

Still further, when the coupling part 7 is arranged adjacently to a stepped part 12 or a curved part 13 formed on the side wall 4, or the stepped part 9 or the curved part 10 formed on the outside wall member 6, the propagation of vibration to the outside wall member 6 can be reduced by arranging the coupling part 7 at positions close to the stepped part or the curved part. Hence, this can reduce the vibration of plane of the air conditioning case 3.

Still further, when the air conditioning case 3 is constructed of parts divided into at least two or more, that is, the upper case 15 and the lower case 16, and the combining part 17 of the upper case 15 and the lower case 16 is constructed along the nearly central line 5 of the evaporator 19 and the coupling part 7 is formed in the combining part 17, the strength of the combining part 17 to which vibration is easily transmitted can be increased and the combination of the upper case 15 and the lower case 16 can be increased. Hence, this can reduce the surface vibration of the air conditioning case 3.

Still further, when the upper case 15 is integrated with the lower case 16 by the joint member 18 at the combining part 17, there is provided an air conditioning case in which the strength of the combining part 17 can be increased.

Still further, when the joint member 18 is constructed of the fastening of screw and the outside wall member 6 has the check opening 31 through which the degree of the fastening of the screw can be checked, there is provided an air conditioning case in which a plurality of cases can be combined with reliability by checking the degree of the fastening of screw through the check opening 31.

Second Embodiment

Figure 6:
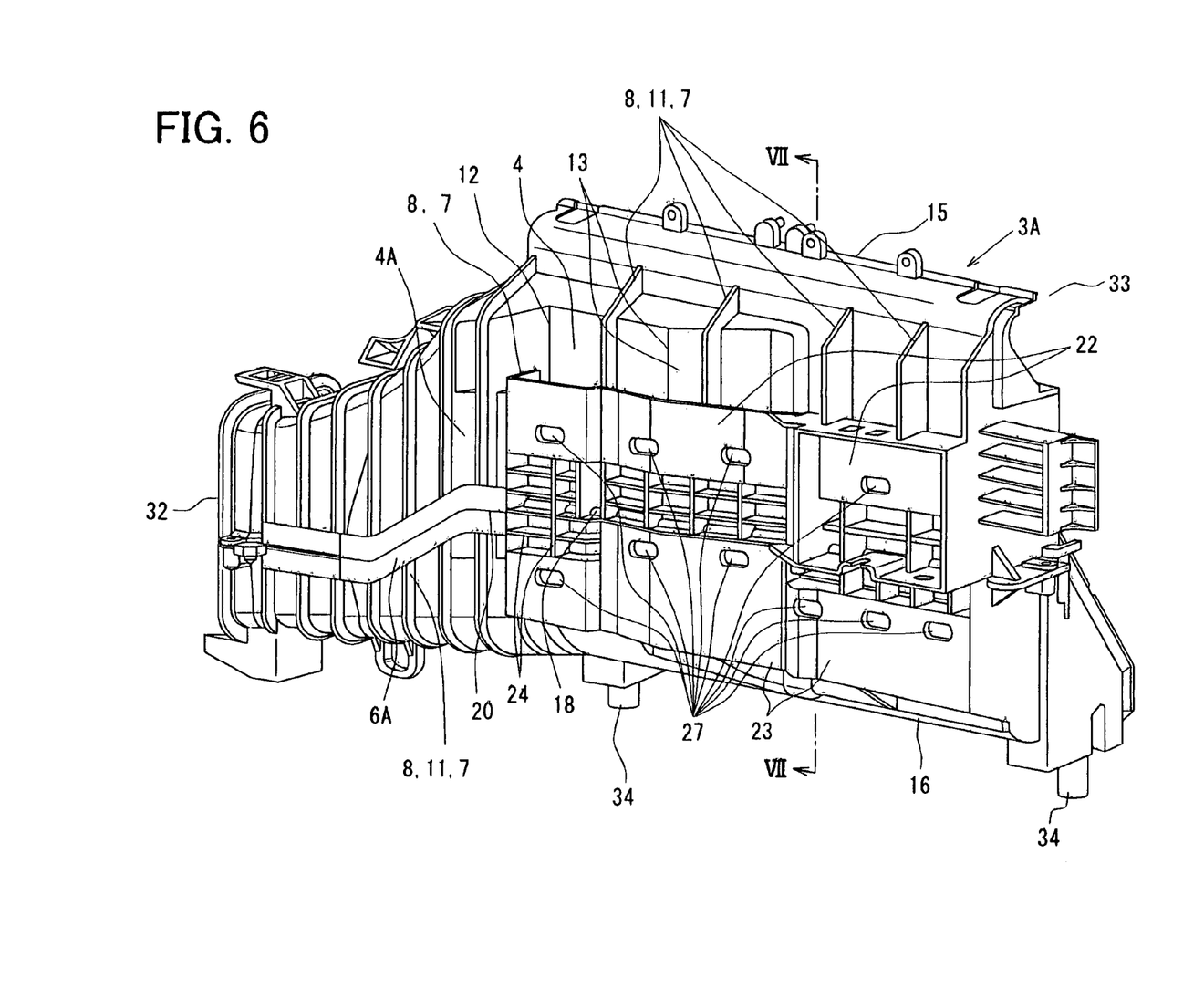
FIG. 6 is a perspective view showing the construction of an air conditioning case in a second embodiment.
Figure 7:
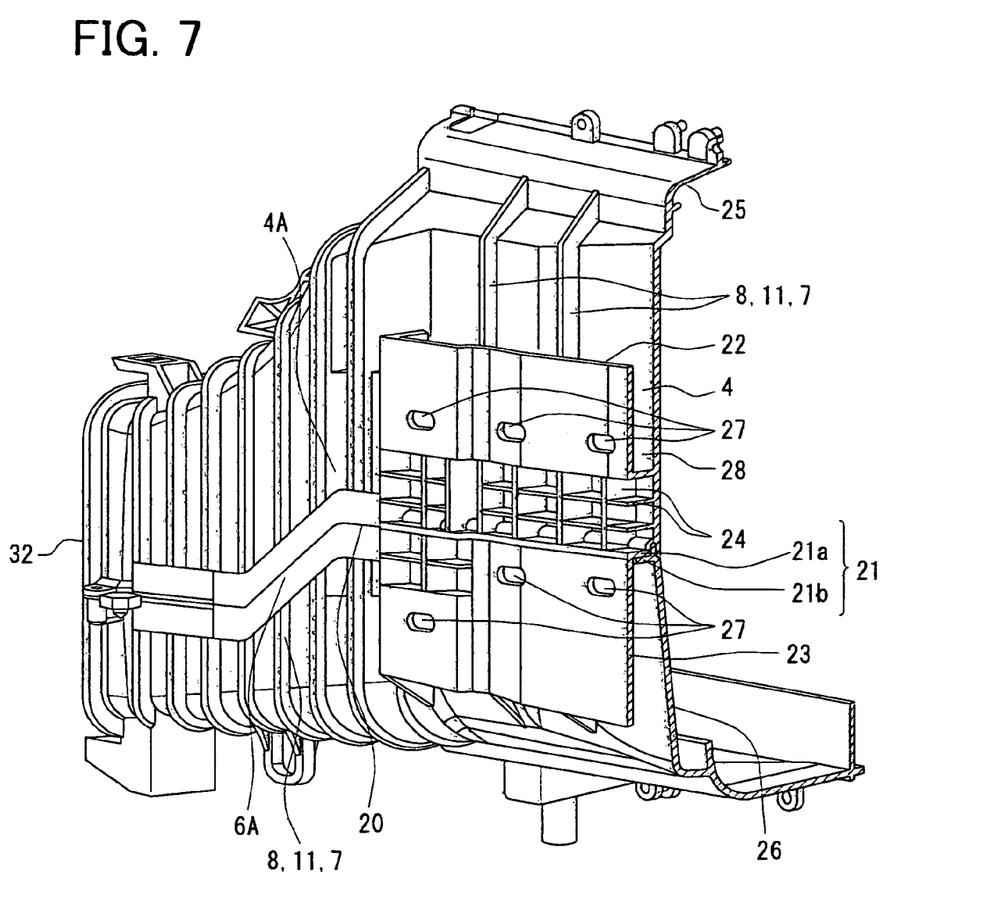
FIG. 7 is a perspective view showing a cut end when the air conditioning case is cut at the line VII-VII in FIG. 6.

This embodiment is different from the air conditioner for a vehicle of the first embodiment in that the shape of the air conditioning case is different from each other, and is the same as the air conditioner in the other construction. Here, the same construction is denoted by the same reference symbols in FIG. 6 and FIG. 7 and its description will be omitted. FIG. 6 is a perspective view showing the construction of an air conditioning case of this embodiment. FIG. 7 is a perspective view showing the shape of the cut end when the air conditioning case is cut along the line VII-VII in FIG. 6.

As shown in FIG. 6 and FIG. 7, a plurality of outside wall members 22, 23 are arranged outside the side wall 4 of an air conditioning case 3A with a clearance created between them and on both sides sandwiching the combining part 21 of the air conditioning case 3A. Each of the outside wall members 22, 23 are integrated with the side wall 4 by a lattice-shaped rib 24 as a coupling part, and the outside wall members 22, 23 are coupled to each other by the lattice-shaped rib 24.

The air conditioning case 3A is constructed of parts divided into at least two or more, that is, the upper case 15 and the lower case 16, and the upper case 15 and the lower case 16 are combined with each other at the combining part 21 formed along the nearly central line 5 of a functional member for an air conditioner. Furthermore, combining portions 21a, 21b are formed in the combining part 21.

The upper case 15 and the lower case 16 are integrated with each other by a joint member 18 in the combining part 21. One example of this joint member 18 is constructed of a fastening screw, and the joint member 18 is arranged in a space formed near a portion where lattice-shaped ribs 24 for coupling the outside wall members 22 and 23 are arranged. The joint member 18 has a construction in which: for example, the upper case 15 and the lower case 16 are opposed to each other at the combining part 21 and the combining portions 21a and 21b are put into contact with each other; the screw is screwed in a threaded hole made through the combining portions 21a and 21b in the up and down direction to fasten the upper and lower cases 15, 16. When the screw is screwed in, the screw is positioned with its head up and its threaded portion down and is screwed in from the upper side to the lower side by a screwdriver or the like. At this time, the screw is fastened in a space adjacent to the lattice-shaped rib 24 and this space is open to the outside and can be visually seen from the outside. Hence, an operator fastening the screw can check the manner in which the screw is fastened.

The outside wall members 22, 23 are constructed so as to have at least one or more openings 27 for cooling a mold. In this embodiment, as one example of the construction, four openings 27 for cooling a mold are arranged closer to the combining part 21 in the outside wall member 22 formed on the upper case 15 and six openings 27 for cooling a mold are arranged closer to the combining part 21 in the outside wall member 23 formed on the lower case 15.

Moreover, it was checked that the same result of experiment as the air conditioning case 3 of the first embodiment were obtained also in the air conditioning case 3A of this embodiment (refer to the first embodiment). As for the verification of the result of experiment on the air conditioning case 3A, the result of the model D in FIG. 8 in the first embodiment can be applied as it is for the air conditioning case 3A. Hence, its description will be omitted and is left to the description in the above-mentioned first embodiment.

In this manner, the air conditioner for a vehicle of this embodiment employs the construction that has the air conditioning device 1, the air conditioning case 3 forming air passage 2 in this air conditioning device 1 and constructed so as to divide the outer frame of the air conditioning device 1 into at least two parts or more, and the plurality of outside wall members 22, 23 arranged outside the side wall 4 of this air conditioning case 3A with a clearance created between them, the plurality of outside wall members 22, 23 being arranged on both sides sandwiching the combining part 21 of the air conditioning case 3A divided into at least two parts or more and integrated with the side wall 4 by the coupling part 24. Therefore, it is possible to reduce the surface vibration of the air conditioning case 3A relative to vibration from the evaporator or vibration transmitted from the engine room and hence to effectively inhibit the occurrence of noises.

Moreover, when the outside wall members 22, 23 have at least one or more opening 27 for cooling a mold, the effect of cooling a mold used when the air conditioning case 3 is manufactured can be increased by the opening 27 for cooling a mold formed in the outside wall members 22, 23 to increase the dimensional accuracy of the shape of the air conditioning case 3 and hence the quality of the air conditioning case 3 can be improved.

Furthermore, when the construction is employed in which the side wall 4 and the outside wall member 6A are different from each other in the shape of outside plane, the vibration frequency characteristics of the inside wall and the outside wall of the air conditioning case 3A are changed from each other. However, coupling the inside wall to the outside wall by the ribs can produce the effect of preventing the resonance vibration of one plane by the other plane because the portions of different vibration frequency characteristics are coupled to each other.

Although the present invention has been fully described in connection with the preferred embodiments thereof with reference to the accompanying drawings, it is to be noted that various changes and modifications will become apparent to those skilled in the art. Such changes and modifications are to be understood as being within the scope of the present invention as defined by the appended claims.

What is claimed is:

1. An air conditioner for a vehicle, comprising:
an air conditioning case for performing air conditioning in a vehicle compartment and having an intake unit, an air conditioning unit and an air conditioning case connecting the intake unit and the air conditioning unit;
an evaporator provided in the air conditioning unit;
an air passage formed in the air conditioning case in a direction of airflow inside the air conditioning case, the air passage communicating with the intake unit for forming a passage to an air suction part of the evaporator;
a side wall for constructing a side shape of the air conditioning case, wherein the side wall is formed to be approximately parallel to the air passage and is formed to be approximately parallel to the air suction part of the evaporator;
an outside wall member arranged outside the side wall so as to have a predetermined clearance with the side wall, wherein the outside wall member is formed is a shape approximately along the side wall; and
a plurality of ribs arranged at specific intervals and provided along the side wall and the outside wall member for integrally coupling the outside wall member and the side wall;
wherein the outside wall member extends across a central line of the evaporator and is formed so that its width in a direction perpendicular to the air flow is shorter than that of the side wall;
wherein the clearance is divided by the plurality of ribs into a plurality of clearances; and
the side wall and the outside wall member are different from each other in a shape of an outer wall surface.

2. The air conditioner for a vehicle according to claim 1, wherein the outside wall member has a stepped portion or a curved portion.

3. The air conditioner for a vehicle according to claim 1, wherein the clearances are provided approximately along the central line of the evaporator and are different in size.

4. The air conditioner for a vehicle according to claim 1, wherein the ribs are longer than the width of the outside wall member.

5. The air conditioner for a vehicle according to claim 1, wherein the ribs are arranged adjacent to a stepped portion or a curved portion provided on the side wall, or a stepped portion or a curved portion provided on the outside wall member.

6. The air conditioner for a vehicle according to claim 1, wherein the ribs are constructed of a lattice-shaped ribs.

7. An air conditioner for a vehicle, comprising:
an air conditioning case for performing air conditioning in a vehicle compartment and having an intake unit, an air conditioning unit and an air conditioning case connecting the intake unit and the air conditioning unit;
an evaporator provided in the air conditioning unit;
an air passage formed in the air conditioning case in a direction of airflow inside the air conditioning case, the air passage communicating with the intake unit for forming a passage to an air suction part of the evaporator;
a side wall for constructing a side shape of the air conditioning case, wherein the side wall is formed to be approximately parallel to the air passage and is formed to be approximately parallel to the air suction part of the evaporator;
an outside wall member arranged outside the side wall so as to have a predetermined clearance with the side wall, wherein the outside wall member is formed is a shape approximately along the side wall; and
a plurality of ribs arranged at specific intervals and provided along the side wall and the outside wall member for integrally coupling the outside wall member and the side wall;
wherein the outside wall member extends across a central line of the evaporator and is formed so that its width in a direction perpendicular to the air flow is shorter than that of the side wall;
wherein the clearance is divided by the plurality of ribs into a plurality of clearances; and
wherein the air conditioning case is constructed of a plurality of case parts to be dividable, a combining part for combining the plurality of case parts, wherein the combining part extends along approximately the central line of the evaporator and a plurality of join portions are provided in the combining part.

8. The air conditioner for a vehicle according to claim 7, wherein the plurality of case parts are integrated with each other by a joint member in the combining part.

9. The air conditioner for a vehicle according to claim 8, wherein the joint member is constructed of a fastening screw, and has a check opening for checking a state of the fastening screw.

10. An air conditioner for a vehicle, comprising:

an air conditioning case for performing air conditioning in a vehicle compartment and having an intake unit, an air conditioning unit and an air conditioning case connecting the intake unit and the air conditioning unit;

an evaporator provided in the air conditioning unit;

an air passage formed in the air conditioning case in a direction of airflow inside the air conditioning case, the air passage communicating with the intake unit for forming a passage to an air suction part of the evaporator;

a side wall for constructing a side shape of the air conditioning case, wherein the side wall is formed to be approximately parallel to the air passage and is formed to be approximately parallel to the air suction part of the evaporator;

an outside wall member arranged outside the side wall so as to have a predetermined clearance with the side wall, wherein the outside wall member is formed is a shape approximately along the side wall; and a plurality of ribs arranged at specific intervals and provided along the side wall and the outside wall member for integrally coupling the outside wall member and the side wall;

wherein the outside wall member extends across a central line of the evaporator and is formed so that its width in a direction perpendicular to the air flow is shorter than that of the side wall;

wherein the clearance is divided by the plurality of ribs into a plurality of clearances; and wherein the air conditioning case is constructed of a plurality of case parts to be dividable and a plurality of outside wall members are provide; and wherein the plurality of outside wall members are arranged on two sides sandwiching a combining part of the plurality of case parts and are integrated with the side wall through a coupling part.

11. The air conditioner for a vehicle according to claim 10, wherein the plurality of outside wall members have at least one or more openings.

* * * * *